United States Patent

Meyers

[15] 3,648,865
[45] Mar. 14, 1972

[54] ARTICLE HANDLING
[72] Inventor: Wheeler W. Meyers, Savona, N.Y.
[73] Assignee: Corning Glass Works, Corning, N.Y.
[22] Filed: July 1, 1970
[21] Appl. No.: 51,521

Related U.S. Application Data

[62] Division of Ser. No. 820,144, Apr. 29, 1969, Pat. No. 3,556,578.

[52] U.S. Cl. .................................................. 214/152
[51] Int. Cl. .................................................. B66c 1/02
[58] Field of Search ............... 214/1 BS, 1 BT, 1 BH, 1 BV, 214/152; 294/64, 65

[56] References Cited

UNITED STATES PATENTS

| | | | |
|---|---|---|---|
| 3,101,021 | 8/1963 | Johnson | 214/1 BS |
| 3,302,967 | 2/1967 | Harris | 294/65 |

*Primary Examiner*—Gerald M. Forlenza
*Assistant Examiner*—George F. Abraham
*Attorney*—Clarence R. Patty, Jr. and Charles W. Gregg

[57] ABSTRACT

Handling apparatus for and method of spacing apart a plurality or multitude of similar articles, such as sticks, canes, rods, tubes or small disks or the like disposed adjacent each other on a relatively flat surface, the apparatus including a main body member embodying a vacuum chamber or cavity having an open side against which one surface of a perforated plate is disposed. A first surface of a perforated sheet or membrane of an elastic or resilient material, such as rubber, is disposed against the second surface of said plate and means are provided for stretching said membrane or sheet. Said method comprises positioning the second surface of the sheet adjacent a multitude of similar ones of said articles, supplying vacuum to said cavity or chamber to draw the articles into firm contact with such second surface of the sheet, stretching said sheet to separate or space said articles apart, and terminating said vacuum to deposit the articles in a spaced apart orientation on a generally flat surface.

4 Claims, 7 Drawing Figures

INVENTOR.
Wheeler W. Meyers

INVENTOR
Wheeler W. Meyers

ARTICLE HANDLING

This is a division of my copending application, Ser. No. 820,144 filed Apr. 29, 1969, which has matured into U.S. Pat. No. 3,556,578.

BACKGROUND OF THE INVENTION

Manual handling of a plurality or multitude of articles having relatively small dimensions is often time consuming and, therefore, usually uneconomical. As an example, a plurality or multitude of similar articles such as tubes, rods, sticks, or disks may be disposed in a single plane on the relatively flat top surface of a table, platform, or suitable support plate or tray, such articles being delivered to said surface either manually, or by chutes or conveyor belts, and then moved about by manual or vibratory oscillation so as to arrange the articles in said single plane. Each article of such a multitude of articles so disposed and arranged invariably contacts, at least at some points or regions thereof, its neighboring articles. Such contact between such articles is undesirable when the articles are to be subjected to certain treatments, such as lubrication or surface protection sprays, or to heat treatments.

As a specific example, rods, posts or canes, employed as supports for the electrodes of electron guns for cathode-ray or television picture tubes, are usually pressure formed from a pulverized material such as powdered glass or glass frit mixed with a binder or agglutinant such as bees wax, gum arabic, paraffin etc. Such binders or agglutinants are normally solid at room temperatures but may be flowed under pressure. A plurality or multitude of such electrode support rods, posts, or canes which are initially pressure formed are subsequently subjected to a heat treatment such as firing or baking in a suitable lehr or oven which drives off or volatizes the binder or agglutinant employed and causes the compressed powdered material of the initially pressure-formed articles to fuse and, thereby, form substantially homogenous articles. If, during such a heat treatment, the initially pressure-formed articles contact each other at any points or regions thereof, such articles usually also become fused to each other at said points or regions of contact and must be discarded. Accordingly, it is desirable or expedient, when subjecting a plurality or multitude of such initially formed articles, such as said support rods, posts, or canes, to the heat treatment discussed, that such articles be spaced apart or separated, that is, be completely out of physical contact with each other at least for a minute distance. The moving of such a plurality or multitude of articles individually and by hand to space the articles apart is time consuming and, of course, as previously mentioned, uneconomical.

In the light of the foregoing specific example, it is the objects of the present invention to provide an apparatus for a method of readily and simultaneously handling a multitude of articles, resting, as previously mentioned, on the top surface of a table, platform, or suitable support plate or tray, so as to space apart or separate such articles from physical contact with each other and redeposit them on said surface, or deposit them on the top surface of another article support member in a spaced apart orientation.

SUMMARY OF THE INVENTION

In accomplishing the above objects of the invention, there is provided a main body member embodying a vacuum chamber or cavity having one open side of substantial areal expanse, a perforated rigid plate hermetically sealed against the perimeter of said open side, a perforated membrane or sheet of elastic, flexible, or resilient material, such as rubber, having one planar surface held against the exposed surface of said plate, and means for stretching said membrane or sheet in selected directions across said exposed surface of said membrane or plate lying over or in contact with a multitude of similar articles resting in a single plane on a suitable support surface as previously mentioned, and vacuum is then supplied through the perforations in said plate and sheet to draw said articles into firm contact with the sheet. The apparatus is then raised to remove the articles from contact with said support surface, and said sheet is then stretched to space apart, separate or move said articles from physical contact with each other. The apparatus is then disposed in close proximity to another relatively flat article support surface, or to the first mentioned support surface, and said vacuum is then terminated to permit the articles to drop on or transfer to the respective support surface in a spaced-apart orientation.

BRIEF DESCRIPTION OF THE DRAWINGS

In the drawings.

Similar reference characters refer to similar parts in each of the FIGS. of the drawings.

PREFERRED EMBODIMENTS OF THE INVENTION

Figure 6:
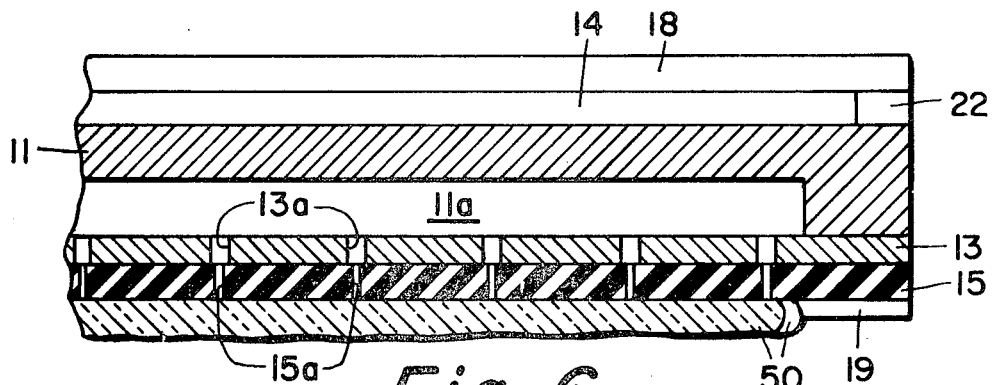
FIG. 6 is an enlarged cross-sectional view of a portion of the apparatus of FIG. 1 taken generally along line 6—6 of FIG. 1 and showing portions of a pair of articles being handled by the apparatus.

Referring to FIGS. 1 through 6 of the drawings in detail, there is shown an apparatus 10 including a main body member 11 embodying a vacuum chamber or cavity 11a (FIGS. 3 and 6) of a relatively large planar areal expanse. The bottom of such chamber or cavity is closed by a flat rigid plate 13 which is hermetically sealed to body member 11 as, for example, by welding the peripheries of such member and plate to each other. Plate 13 is shown as provided with a plurality of perforations or passages preferably in the form of slots 13a (FIGS. 1 and 6) which are generally evenly spaced from each other and which extend parallel to the length of such plate. Said slots, passages or perforations extend through plate 13 from one planar surface thereof to the other such surface as best shown in FIG. 6.

The apparatus further includes a pair of slide plates 12 and 14 whose bottom surfaces rest on the top surface of body member 11. A pair of guide members 20 and 24 are provided at the opposite ends of slide plate 12 and are secured to the top surface of member 11 in any convenient manner, such as by welding for example. A similar pair of guide members 22 and 26 are provided at the opposite ends of slide plate 14 and are secured to the top surface of member 11 in any convenient manner. A guide plate 16 extends across the top of slide plate 12 and is fastened at its ends, and in any convenient manner, to guide members 20 and 24. Similarly, a guide plate 18 extends across the top of slide plate 14 and is fastened at its ends to guide members 22 and 26. Guide plate 16, and guide members 20 and 24 are dimensioned and arranged so that slide plate 12 fits snugly but slidably between the inwardly facing surfaces of guide members 20 and 24, and between the top and bottom surfaces of body member 11 and guide plate 16, respectively. Guide plate 18 and guide members 22 and 26 are also dimensioned and arranged so that slide plate 14 fits snugly but slidably between the bottom surface of plate 18 and the top surface of body member 11, and between the inwardly facing surfaces of members 22 and 26. Such arrangements will be readily apparent from a brief glance at the drawings.

Figure 1:
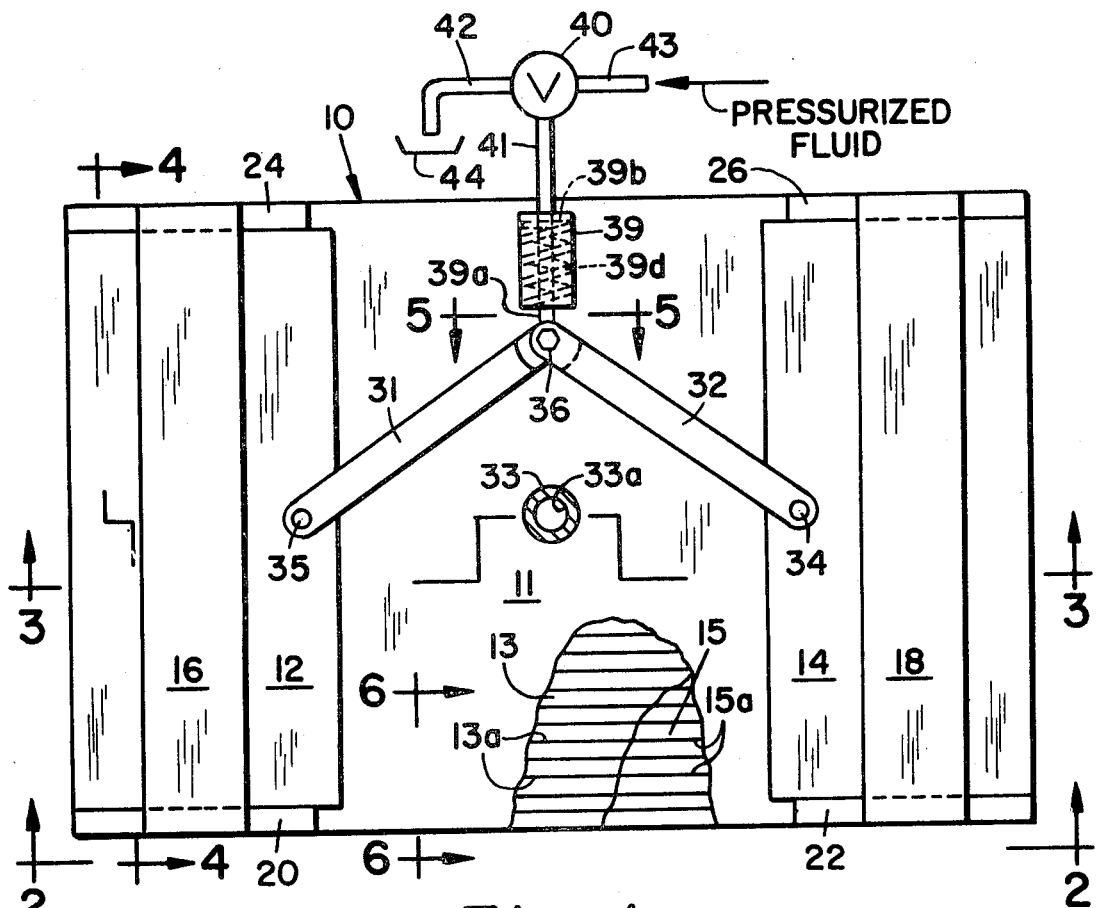
FIG. 1 comprises a top plan view of one form of apparatus embodying the invention, such view including broken-away portions to show certain internal parts of the apparatus.
Figure 2:
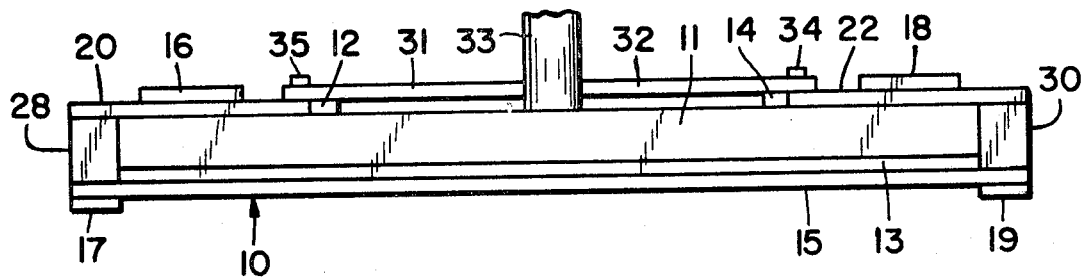
FIG. 2 is an elevational view of the apparatus of FIG. 1 and taken generally along line 2—2 of FIG. 1.
Figure 3:
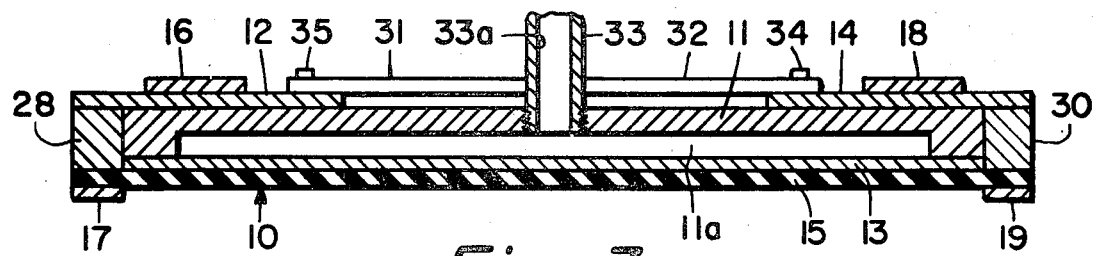
FIG. 3 is a cross-sectional view of the apparatus of FIG. 1, such view being taken generally along line 3—3 of FIG. 1.
Figure 4:
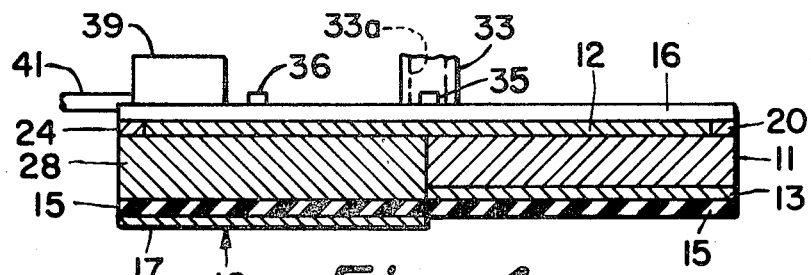
FIG. 4 is a view similar to that of FIG. 3 and taken generally along line 4—4 of FIG. 1.

There is affixed to the under surface of slide plate 12 a longitudinal member 28 which normally abuts against a first end of body member 11 as shown in FIG. 3. A second longitudinal member 30 normally abuts against the second end of body member 11 and is affixed to the under surface of slide member 14. The bottom surface of plate 13 is flat and relatively smooth, and a membrane or sheet 15 of an elastic, resilient or flexible material, such as rubber, is tautly spread over said smooth bottom surface of plate 13 with one of the planar surfaces of the sheet in contact with such surface. Membrane or sheet 15 is provided with a plurality of perforations or passages 15a (FIGS. 1 and 6) preferably corresponding to those provided in plate 13 and extending through the sheet from one planar surface thereof to the other. Sheet 15 is spread over said bottom surface of plate 13 so that the passages, perforations or slots 15a in such sheet connect with the passages, perforations or slots 13a in plate 13.

The upper surface of sheet 15 as shown in FIG. 3 is disposed, at first and second ends thereof, against the bottom surfaces of longitudinal members 28 and 30, respectively, and a pair of longitudinal and relatively thin strips 17 and 19 of a rigid material are placed against the bottom surface of sheet 15 at said first and second ends thereof, respectively. Strips 17 and 19 are then fastened to their respectively overlying members 28 and 30, as by countersunk screws (not shown) extending upwardly through the respective strips, and the portions of the ends of sheet 15 overlying such strips, and screwed tightly into the respective members 28 and 30. It will be apparent to those skilled in the art that said portions of the ends of sheet 15 overlying plates 17 and 19 are, by the arrangement described, tightly and hermetically clamped between longitudinal members 28 and 30 and their respectively associated strips 17 and 19.

A handling rod or operating shaft 33 having a threaded lower end is securely attached or fastened in the upper wall of body member 11 by being screwed into cooperative threads provided in a hole in such wall at substantially the center thereof. Such rod or shaft embodies a passage 33a which connects with vacuum chamber or cavity 11a in member 11 and through which vacuum, suction or negative pressurized fluid can be supplied to said chamber or cavity. For purposes of simplification of the drawings only a lower portion of rod or shaft 33 is shown in the drawings. However, rod or shaft 33 may be of any desired length and the upper end thereof may be connected to a machine for operation of the apparatus shown, or such rod or shaft may be used for manual handling of the apparatus.

Figure 5:
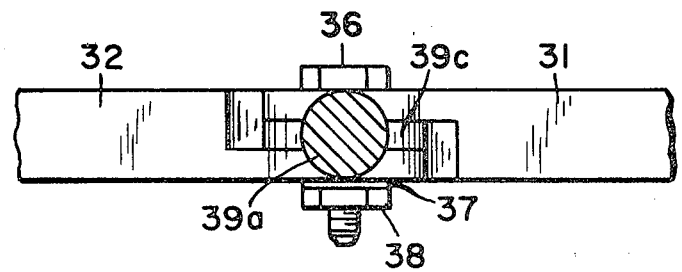
FIG. 5 is an enlarged detailed view of part of the apparatus of FIG. 1, such view being taken generally along line 5—5 of FIG. 1.

A pair of actuating arms 31 and 32 for slide members 12 and 14, respectively, are provided, and first ends of such arms are pivotally connected to such slide members 12 and 14, respectively, as by suitable headed pivot pins or axles 35 and 34, respectively. The body portions of pins or axles 35 and 34 extend through suitably fitting and cooperative holes provided in said first ends of arms 31 and 32, and such pins or axles are then secured to or are affixed in the respective slide members 12 and 14. As best illustrated in FIG. 5, the second ends of actuating arms 31 and 32 are pivotally attached to a generally flat first end 39c of a piston rod 39a of a pressurized fluid cylinder 39 to be hereinafter discussed. Such pivotal attachment is provided by a suitable pin or bolt 36 extending through cooperatively fitting holes in the second ends of arms 31 and 32, and in said flat end of piston rod 39a. A washer 37 is provided on the lower end of pin or bolt 36 and a lock nut 38 is screwed onto cooperative threads on such lower end of the pin or bolt.

Previously mentioned cylinder 39 is secured to the top surface of body member 11 as by welding, for example, and one end of a pressurized fluid conduit 41 is connected to one end of the cylinder. Cylinder 39 includes the usual piston 39b which is secured to the second end of the above mentioned piston rod 39a and a compressible coil spring 39d surrounds such piston rod within cylinder 39. Such spring bears against one end of cylinder 39 and against piston 39b to normally bias such piston and its associated piston rod 39a to retracted positions within cylinder 39. Such pressurized fluid cylinders and their associated parts just described are, of course, well known.

The second end of the previously mentioned fluid conduit 41 is connected to one outlet port of a two-way valve 40 and one end of a second fluid conduit 42 is connected to a second outlet port of such valve. The other end of conduit 42 is connected to atmosphere or to a suitable fluid sink 44. A first end of a third fluid conduit 43 is connected to the inlet port of valve 40 and the second end of conduit 43 is connected to a suitable source of pressurized pneumatic or hydraulic fluid which is not shown in the drawings for purposes of simplification thereof. Valve 40 may be a manually or automatically actuated valve as is believed apparent.

It is expedient to point out at this point in the description that the passages or perforations provided in plate 13 and in sheet 15 may be longitudinal slots which extend parallel with each other along any selected portion of the length of such plate and sheet or, alternatively, said passages, or perforations may comprise a plurality of successions or series of shorter slots, or, further, rows of circular, oval or other shaped orifices or apertures. Therefore, the term "perforations" as employed herein is intended as a generic term to cover all of the types, configurations and arrangements of passages, orifices or apertures mentioned. However, it is required that the perforations provided in sheet 15 connect with the perforations in plate 13 before, during, and after the stretching of sheet 15 as hereinafter discussed.

As a specific example of the construction of apparatus 10, sheet 15 may have a uniform thickness on the order of 0.125 inch and may be rubber having a hardness of 40 on a durometer scale. As an example of the dimensions and spacing of the perforations provided in plate 13 and sheet 15 when handling a multitude of rods, posts, sticks, canes etc., such as the supports for the electrodes of the electron guns previously mentioned, the centers of the slots such as 13a provided in plate 11 (FIGS. 1 and 6) may be on the order of 0.50 inch apart and each said slot may have a width of approximately 0.10 inch. The centers of the slots such as 15a provided in sheet 15 may be spaced correspondingly to said slots 13a and each such slot 15a may have a width of approximately 0.06 inch. Said electrode supports may, for example, have a diameter or thickness of about 0.25 inch or less, and the length of said perforations or slots such as 13a and 15a will preferably substantially correspond to the length of a row or a plurality of rows of the electrode supports to be handled. However, as is obvious, such dimensions and arrangements of the perforations will depend on the articles to be handled by the apparatus and the dimensions and arrangement of the perforations described above, as well as the arrangement of the perforations shown in FIGS. 1 and 6 of the drawings, are only for purposes of illustration and descriptive examples.

Figure 7:
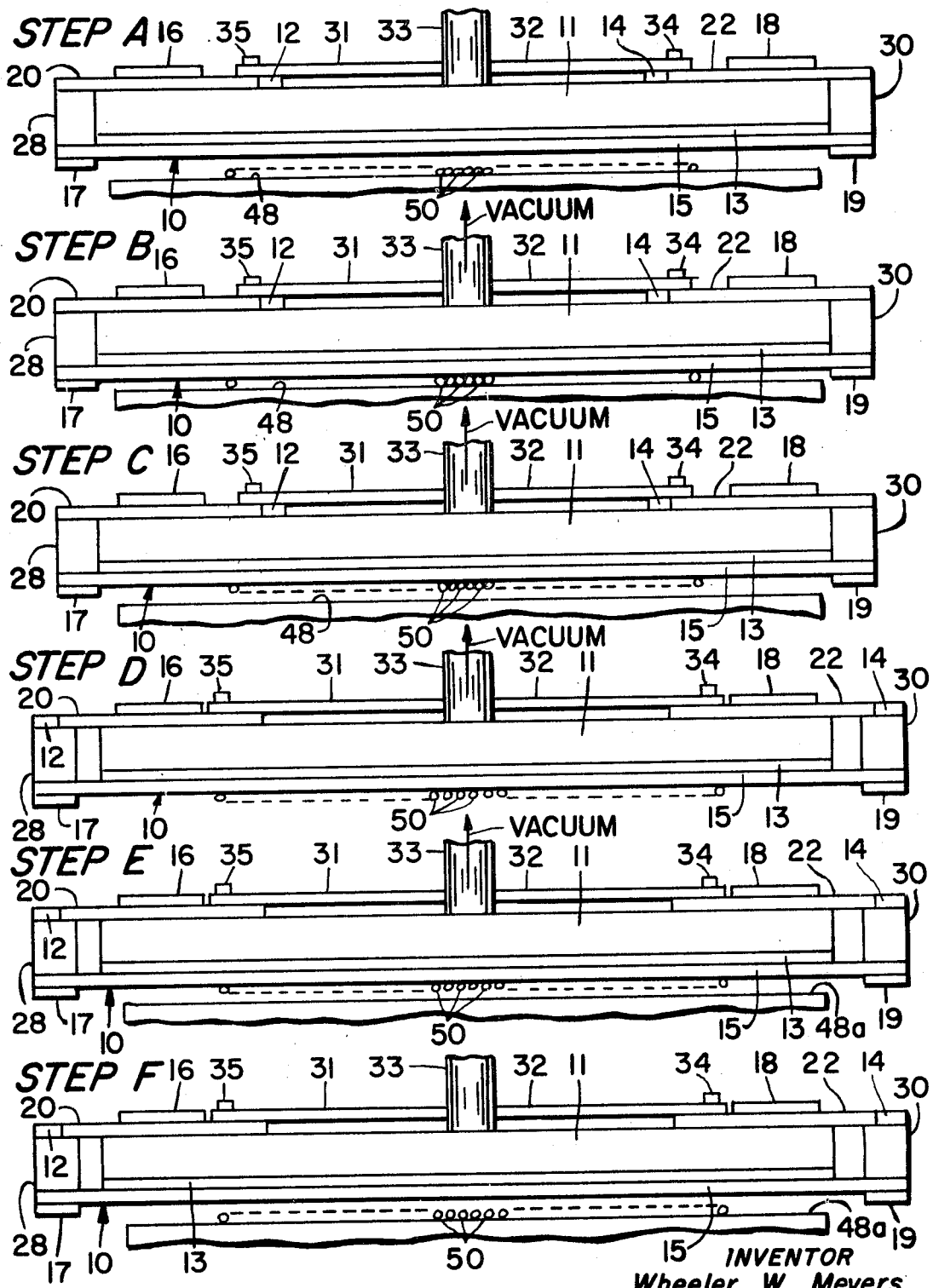
FIG. 7 comprises schematic elevational views of the apparatus embodying the invention in practicing the inventive method disclosed, such views comprising steps A through F.

Referring now to FIG. 7 of the drawings, a brief operational example of the invention will be given in conjunction with steps A through F shown in such drawing Fig.

Referring first to step A, a plurality or multitude of longitudinal articles such as 50 (see also FIG. 6) are shown as arranged adjacent each other in a row on a suitable supporting surface 48 which may be, for example and as previously mentioned, the top surface of a table, platform plate or tray etc. Apparatus 10 is shown in such step A as being disposed above said supporting surface 48 and the articles such as 50 thereon.

In step B, apparatus 10 is lowered so that the bottom surface of sheet 15 is contacting or near contacting said articles such as 50 and, following such lowering, vacuum, suction or negative pressure is supplied through passage 33a in rod or shaft 33 and thence to vacuum cavity or chamber 11a. The rods 50 are then drawn or forced by atmospheric pressure into relatively firm contact with the lower surface of sheet 15 as is believed obvious.

In step C, apparatus 10 is again raised while said vacuum or negative pressure is continued to be supplied to vacuum cavity or chamber 11. Articles 50 remain in contact with the lower surface of sheet 15 at such time and are raised along with apparatus 10.

Following the raising of apparatus 10 and articles 50 as shown in step C, slide plates 12 and 14 are actuated in opposite directions extending parallel with the length of body member 11 as illustrated in step D, and longitudinal members 28 and 30 are thereby, actuated in corresponding directions while vacuum is still supplied to vacuum chamber 11a at such time. Such actuation of members 28 and 30 stretches sheet 15, and the articles such as 50 supported against the lower surface of sheet 15 are, thereby, separated or further spaced apart from each other incremental distances corresponding to the increase in length of sheet 15, that is, corresponding to the distance sheet 15 is stretched. Said actuations of slide plates 12 and 14 and of longitudinal members 28 and 30 is performed by operation of valve 40 so that pressurized fluid is supplied through such valve to conduit 41 and thence to cylinder 49. Such fluid actuates piston 39b of such cylinder to extend piston rod 39a and, thereby, supply a force to actuating arms 31 and 32 which actuates said slide plates and members as described. The distances which said components are moved depends on the pressure of the fluid supplied to cylinder 39 as compared to the increasing opposing force exerted by spring 39d during the compression thereof. This is believed readily apparent. As is also believed obvious, if it is desired to more positively adjustably limit the distances which said components are moved and to which sheet 15 is stretched, an adjustable stop member may be provided on the top surface of body member 11 so as to be contacted by the end of piston rod 35a or by one of the actuating arms 31 and 32 during the movement of the respective part.

Apparatus 10, and the articles such as 50 now disposed in a separated or spaced-apart orientation on the bottom surface of sheet 50, are next lowered towards a surface 48a suitable for supporting said articles in their said spaced-apart orientation. Support surface 48a may be the same support surface 48 from which the articles were initially removed or, alternatively, surface 48a may be the top surface of another suitable table, platform or plate etc. When, for example, the multitude of spaced-apart articles such as 50 are to be subjected to a heat treatment as previously discussed, support surface 48a must, of course, be the upper surface of a plate or tray of a material which can withstand the temperatures of the heat treatment to which said articles are to be subjected. Vacuum or suction is still supplied to vacuum cavity 11a during said lowering.

Apparatus 10 and the supported articles are lowered as discussed above until such articles are in close proximity to or in light-pressure physical contact with said support surface 48a illustrated in FIG. E.

In step F, the vacuum to vacuum chamber 11a is terminated and the articles such as 50 are thereby transferred or are dropped onto surface 48a in their separated or spaced apart orientation as illustrated in such step F. Apparatus 10 is then raised and valve 40 is reactuated to connect fluid conduit 41 to sink 44 or to atmosphere. Spring 39d in cylinder 39 retracts piston 39b and, thereby, piston rod 39a, and actuating arms 31 and 32 move to their normal positions shown in FIG. 1 during such movements. Such operation returns slide plates 12 and 14, and longitudinal members 28 and 30 to their normal positions shown in FIGS. 1, 2 and 3, and sheet 15 contracts to its normal length during said operations or movements. Apparatus 10 is now back to its normal condition and ready for handling another similar plurality or multitude of articles.

As will be obvious to those skilled in the art, many arrangements can be provided for imparting force to slide plates 12 and 14, to cause the required sliding movement of such plates and the resultant movement of their associated parts. Such arrangements could include rocker arms, levers, cams etc., which are actuated by suitable prime movers or, alternatively, by hand. Furthermore, as previously mentioned, an apparatus such as that disclosed, can be used for separating or spacing apart disks which are disposed adjacent each other in rows, as well as the longitudinal types of articles discussed more in detail. Therefore, the terms "article" and "articles" as employed herein are intended to be generic terms which include tubes, rods, sticks, canes, strips, and posts, as well as small disks having any circumferential configuration. In addition, the terms "adjacent" and "adjacent to," as employed herein in relation to the spacing of the articles modified by such terms, are employed in their broad sense, that is, articles which are "in adjacency" with each other, or articles which are "adjacent" or "adjacent to" each other, may or may not be in physical contact with each other but, when not in such contact, are spaced relatively close to each other. It is believed that it may be expedient to also point out that the term "negative pressure" as employed herein is intended to mean pressure below atmospheric pressure, that is, vacuum or suction.

I claim:

1. A method of handling a plurality of similar articles disposed on a relatively flat surface, such method comprising,
    A. disposing one planar surface of a perforated resilient sheet over said articles,
    B. supplying vacuum to the second planar surface of said sheet to draw said articles into firm contact with said one planar surface of said sheet,
    C. stretching said sheet to move adjacent ones of said articles further out of adjacency with each other,
    D. disposing said one planar surface of said sheet in close proximity to a relatively flat surface disposed for receipt of said articles, and
    E. terminating said vacuum to release said articles onto said relatively flat surface.

2. The method in accordance with claim 1 and in which said articles are glass rods or posts.

3. The method in accordance with claim 1 and in which said articles are electrode support posts for an electron gun for a cathode-ray tube.

4. The method in accordance with claim 2 and in which said rods or posts are electrode support posts for an electron gun for a cathode-ray tube.

* * * * *